United States Patent Office 3,758,514
Patented Sept. 11, 1973

3,758,514
SUBSTITUTED BUTYROLACTONES DERIVED FROM NON-CONJUGATED POLYOLEFINS
El Ahmadi I. Heiba, Princeton, and Ralph M. Dessau, Highland Park, N.J., assignors to Mobil Oil Corporation, New York, N.Y.
No Drawing. Continuation-in-part of applications Ser. No. 799,938, Feb. 17, 1969, now abandoned, and Ser. No. 30,582, Apr. 21, 1970, which is a continuation-in-part of abandoned application Ser. No. 714,447, Mar. 20, 1968. This application Oct. 15, 1971, Ser. No. 189,741
Int. Cl. C07d 5/06
U.S. Cl. 260—343.6                    5 Claims

ABSTRACT OF THE DISCLOSURE

This specification discloses substituted butyrolactones having as substituents on the gamma carbon atom an alkenyl group, a butyrolactone-substituted alkyl group, or a butyrolactone-substituted alkenyl group. These compounds are formed by reacting an aliphatic non-conjugated polyolefin of 6 or more carbon atoms with a carboxylic acid having the formula

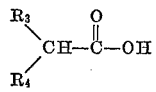

in the presence of a reducible metal ion of higher valent form such as managanic ion, $Mn^{+3}$. $R_3$ and $R_4$ may be hydrogen or an alkyl or cyano group containing in both groups a total of not more than 3 carbon atoms. $R_3$ may be the same as or different from $R_4$. Certain of these compounds can be polymerized, or copolymerized, with other olefinic materials, to form polymers, or copolymers, which can be employed in the manufacture of fibers. Certain of these compounds also can be reacted with an O,O-(dialkyl)phosphorodithioic acid to form an addition product which is useful as an antifriction agent for lubricating oils or as an insecticide or a herbicide. Other of these compounds can be hydrolyzed with an acid such as hydrochloric acid to form polyhydroxy, polycarboxylic acids which can be used for preparing alkyd resins.

CROSS-REFERENCES TO RELATED APPLICATIONS

This application is a continuation-in-part of our copending applications Ser. Nos. 799,938, filed Feb. 17, 1969, and now abandoned and 30,582, filed Apr. 21, 1970. This latter application is a continuation-in-part of our application Ser. No. 714,447, filed Mar. 20, 1968, and now abandoned.

BACKGROUND OF THE INVENTION

Field of the invention

This invention relates to substituted butyrolactones, substituents on the gamma carbon atom being an alkenyl group, a butyrolactone-substituted alkyl group, or a butyrolactone-substituted alkenyl group.

Description of the prior art

U.S. Pat. No. 3,332,963, issued July 25, 1967, discloses gamma-butyrolactones containing as substituents on the alpha carbon atom alkenyl groups or cyclic groups containing an allyl structure.

U.S. Pat. No. 3,413,245, issued Nov. 26, 1968, discloses specifically gamma-butyrolactones but makes reference to a general formula for lactones wherein, if the lactone were a butyrolactone, substituents on the gamma carbon atom would be unsaturated alkyl radicals.

SUMMARY OF THE INVENTION

In accordance with the invention, there is provided a lactone of the formula:

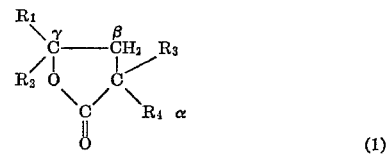

(1)

In this formula, $R_1$ may be an alkenyl group containing at least 4 but not more than 18 carbon atoms. The olefinic unsaturation of this alkenyl group is non-conjugated with respect to the beta-gamma, carbon-carbon linkage of the butyrolactone ring. $R_1$ may also be a butyrolactone-substituted alkyl or alkenyl group containing at least 4 but not more than 16 carbon atoms. The beta-gamma, carbon-carbon linkage of the butyrolactone substituent on the alkyl or alkenyl group is also non-conjugated with respect to the beta-gamma, carbon-carbon linkage of the butyrolactone ring. $R_2$ may be hydrogen or a methyl group. Further, in this formula, $R_3$ and $R_4$ may be hydrogen or may be an alkyl or cyano group containing a total of not more than 3 carbon atoms. $R_3$ may be the same as or different from $R_4$.

In Formula 1 above, the alpha, beta, and gamma carbon atoms are labeled.

DESCRIPTION OF THE PREFERRED EMBODIMENTS

The lactones of the present invention can be prepared employing the process described in our copending application Ser. No. 30,582, filed Apr. 21, 1970. In this process, a solution containing an olefinic reactant is heated for a period of time with a carboxylic acid in the presence of a metal ion of higher valent form such as trivalent manganese ion. The carboxylic acid must contain at least 1 hydrogen atom on the alpha carbon atom. The reaction may be carried out by heating to temperatures between 80° C. and 100° C. The time of reaction may be an hour or less to 5 to 10 hours or more. An inert atmosphere, such as one of nitrogen, carbon dioxide, helium, or the like, is desirably maintained over the reaction mixture to lessen or avoid oxidation by air. The solvent for the solution, in which the compound of metal must also be soluble, may be the carboxylic acid to be reacted with the olefinic reactant. However, the solvent may be another compound such as an anhydride or ester of the carboxylic acid. Aliphatic ethers and aliphatic hydrocarbons may also be employed as solvents. Besides manganese, other higher valent metal ions such as cerium, vanadium, and nickel may be employed. In the reaction mixture, the concentration of the olefinic reactant may range from 0.01 to 3 moles, preferably 0.25 to 1 mole, per mole of metal compound. The amount of carboxylic acid to be employed will be discussed later.

In the process of the copending application, the carboxylic acid reacts with the ion of the metal in higher valent form to form a free radical. Concomitantly, the ion of the metal is reduced to a lower valent form. Thus, where manganic ion, $Mn^{+3}$, is employed, it is reduced to manganous ion, $Mn^{+2}$. The free radical then reacts with the olefinic reactant to form the lactone.

For the preparation of the substituted butyrolactones of the present invention, employing the process disclosed in the aforementioned copending application, the olefinic reactant is an aliphatic, non-conjugated polyolefin having at least 6 but not more than 20 carbon atoms per molecule. Typical of such polyolefins are: 1,4-hexadiene; 1,5-hexadiene; 2,5-dimethyl hexadiene-1,5; 1,4-heptadiene; 1,5-heptadiene; 1,6-heptadiene; 1,7-heptadiene; 1,4-octadiene; 1,5-octadiene; 1,6-octadiene; 1,7-octadiene; and 1,6,11-dodecatriene. Preferred is 1,7-octadiene.

Further, for the preparation of the substituted butyrolactones of the present invention, employing the process disclosed in the aforementioned copending application, any carboxylic or cyanocarboxylic acid containing 2 to 5 carbon atoms and having at least 1 hydrogen atom on the alpha carbon atom may be employed for reaction with the aliphatic non-conjugated polyolefin. Thus, acetic, propanoic, butanoic, or pentanoic acid may be employed. The butanoic and pentanoic acids may be straight chain or may be branched chain acids. For example, the butanoic acid employed may be n-butanoic or isobutanoic acid. Further, for example, the pentanoic acid may be n-pentanoic, isopentanoic, or 2- or 3-methyl butanoic acid. Cyanoacetic, cyanopropanoic, and cyanobutanoic acids may also be employed. These acids may also be straight chain or branched chain acids. Each of the acids that may be employed has the formula:

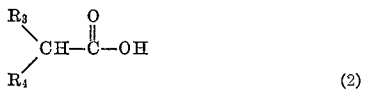
(2)

wherein $R_3$ and $R_4$ are hydrogen or an alkyl or cyano group containing no more than 3 carbon atoms. Where $R_3$ and $R_4$ are alkyl or cyano groups, the total number of carbon atoms in the two groups will not exceed 3.

An explanation of the synthesis reaction disclosed in the aforementioned application would appear to be helpful in understanding the nature of the substituted butyrolactones of the present invention. Assuming that the aliphatic non-conjugated polyolefin is 1,7-octadiene, i.e.,

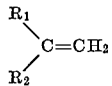

wherein $R_1$ is $CH_2=CH-(CH_2)_4-$ and $R_2$ is hydrogen, and that the ion of higher valent form is trivalent manganese ion, the reaction is as follows:

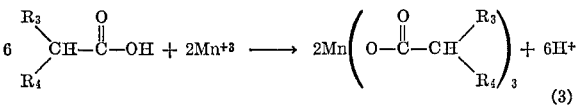
(3)

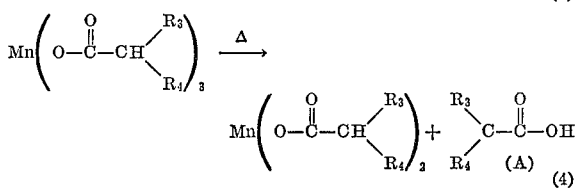
(4)

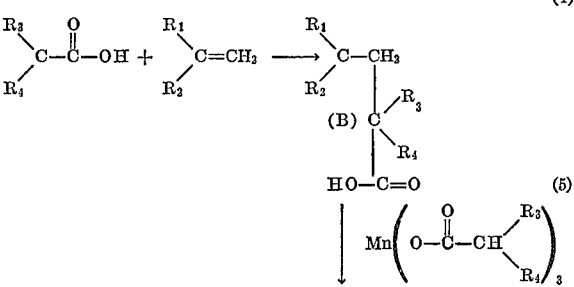
(5)

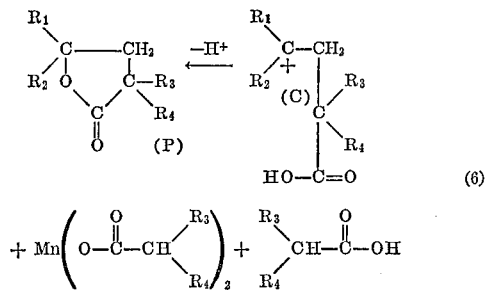
(6)

As shown in Equation 3, the carboxylic acid reacts with the manganic ion to form the salt of the carboxylic acid. As shown in Equation 4, the free radical (A) is produced when the salt is heated. According to the reaction of Equation 5 which takes place in the presence of the olefinic reactant and product of Equation 4, the free radical adds to the double bond of the olefinic reactant forming the free radical (B). The cation (C) then forms with reduction of $Mn^{+3}$ to $Mn^{+2}$, and the cation (C) loses a hydrogen ion to form the substituted butyrolactone product (P).

It will be seen from the foregoing equations for the reaction that the $R_3$ and $R_4$ substituents on the alpha carbon atom of the lactone are the $R_3$ and $R_4$ substituents on the alpha carbon atom of the carboxylic acid. Thus, where acetic acid is the acid employed, $R_3$ and $R_4$ will each be hydrogen. Similarly, where propanoic acid is employed, one of $R_3$ or $R_4$ will be hydrogen and the other will be a methyl group. Where cyano acetic acid is employed, one of $R_3$ or $R_4$ will be hydrogen and the other will be the cyano group of the cyanoacetic acid.

It will also be seen from the foregoing equations that the $R_1$ and $R_2$ substituents on the gamma carbon atom of the lactone will depend upon the aliphatic non-conjugated polyolefin employed. It will also be seen that the $R_1$ substituent will depend upon the amount of carboxylic acid employed. Further, it will be seen that, where the $R_1$ substituent is a butyrolactone-substituted alkyl or alkenyl group, this substituent will depend upon whether the reaction is carried out in a single stage employing a single carboxylic acid or in two separate stages employing a different carboxylic acid in each stage. Thus, where the $R_1$ substituent is to be an alkenyl group, this substituent will be obtained where a diolefin is employed and 1 mole of the diolefin is reacted with 1 mole of the carboxylic acid. For example, where 1,7-octadiene is employed and 1 mole of this diolefin is reacted with 1 mole of carboxylic acid, the $R_1$ substituent, as indicated for the equations above, will be the alkenyl group $$-(CH_2)_4-CH=CH_2.$$

Further, where the $R_1$ substituent is to be a butyrolactone-substituted alkyl group, this substituent will be obtained where a diolefin is employed and 2 moles of carboxylic acid are reacted with 1 mole of the diolefin. For example, where 1,7-octadiene is employed and 1 mole of this diolefin is reacted with 2 moles of acetic acid, the $R_1$ substituent will be

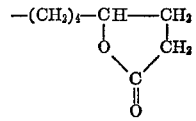

If 1 mole of this diolefin is reacted with 1 mole of acetic acid in a first stage and the lactone product obtained in the first stage is reacted in a subsequent stage with 1 mole of propanoic acid, the $R_1$ substituent will be

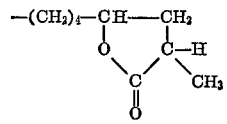

Where the $R_1$ substituent is to be a butyrolactone-substituted alkenyl group, this substituent will be obtained where a triolefin is employed and 2 moles of carboxylic acid are reacted with 1 mole of the triolefin. For example, where 1,6,11-dodecatriene is employed and 1 mole of this triolefin is reacted with 2 moles of acetic acid, the $R_1$ substituent will be

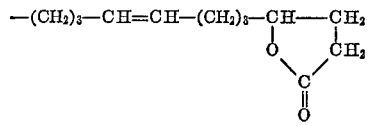

If 1 mole of this diolefin is reacted with 1 mole of acetic acid in a first stage and the lactone product obtained in the first stage is reacted in a subsequent stage with 1 mole of propanoic acid, the $R_1$ substituent will be

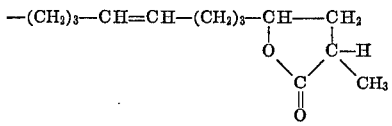

The $R_2$ substituent will be hydrogen or a methyl group depending upon whether hydrogen or a methyl group is the substituent on the carbon atom of the aliphatic non-conjugated polyolefin to which the $R_1$ substituent is attached.

It was stated previously that the amount of carboxylic acid to be employed would be discussed later. Referring back to Equation 5, it will be seen that the free radical can attach to one of the carbon atoms forming each of the double bonds of the aliphatic non-conjugated polyolefin. However, the tendency of the free radical to attach to a carbon atom to each of the double bonds is reduced where the amount of carboxylic acid in the reaction mixture provides no more than 1 molecule per molecule of the aliphatic non-conjugated polyolefin. Thus, referring to the previous paragraph, where the $R_1$ substituent is to be alkenyl group, the reaction is carried out employing 1 mole of carboxylic acid for each mole of aliphatic non-conjugated polyolefin. Further, where the $R_1$ substituent is to be a butyrolactone-substituted alkyl or alkenyl group. the reaction is carried out employing at least 2 moles of carboxylic acid for each mole of aliphatic non-conjugated polyolefin.

The preferred metal ion for use in the process for forming the substituted butyrolactones of the invention is trivalent manganese, or manganic, ion, $Mn^{+3}$ which, as indicated hereinabove, is reduced during the reaction to bivalent manganese, or manganous, ion, $Mn^{+2}$. The manganic salt of the carboxylic acid employed for reaction with the aliphatic non-conjugated polyolefin is the preferred $Mn^{+3}$-producing compound. Thus, where the carboxylic acid is acetic acid, the preferred $Mn^{+3}$-producing compound is manganic acetate, preferably manganic acetate dihydrate.

The substituted butyrolactones of the invention are useful for various purposes. For example, those wherein the $R_1$ substituent is an alkenyl group can be polymerized, or copolymerized, with other olefinic materials, to form polymers or copolymers which can be employed in the manufacture of fibers. Polymerization and copolymerization procedures can be those conventionally used for olefins and olefinic esters. For example, free radical systems and Ziegler catalysts can be employed. For example, the substituted butyrolactone of Example 2 following can be polymerized by free radical initiators such as peroxides, peresters, azo-bis-isobutyronitrile to form a polylactone which can be used in the manufacture of fiber. Additionally, the substituted butyrolactone of Example 2 can be copolymerized with propylene in the same manner to form a copolymer which can be used as a viscosity improver for hydrocarbon lubricating oils. Further, the lactones wherein the $R_3$ substituent is an alkenyl group can be reacted with an O,O-(dialkyl)phosphorodithioic acid to form an addition product which is useful as an antifriction additive for lubricating oils, or as an insecticide or a herbicide. For example, the substituted butyrolactones of Examples 1–3 following can be reacted with O,O-diethylphosphorodithioic acid in the presence of a free radical initiator, such as a peroxide, a diperoxide, a perester, or oxygen in the presence of an organic salt of manganese, to form an antifriction additive for lubricating oils. The substituted butyrolactones wherein the $R_1$ substituent is a butyrolactone-substituted alkyl or alkenyl group can be hydrolyzed with an acid such as hydrochloric acid to form polyhydroxy, polycarboxylic acids and these can be used in forming alkyd resins by condensation with polyols such as ethylene glycol, propylene glycol, glycerol, pentaerythritol, etc.

The following examples will be illustrative of the invention.

EXAMPLE 1

To each of two 1.3 liter Pyrex bombs are added 66.16 grams (0.24 mole) of $Mn(OAc)_3 \cdot 2H_2O$ (manganic acetate dihydrate) and 600 milliliters of 10% potassium acetate in acetic acid. The resulting mixtures are degassed by bubbling nitrogen through them for 20 minutes. Then, 13.22 grams (0.12 mole) of 1,7-octadiene is added to each. The bombs are sealed and placed in a 160° C. oil bath for one hour. They are then removed from the bath and cooled to about 20° C. The cooled bombs are opened and the acetic acid distilled therefrom through a rotary evaporator. The combined residues are taken up in 2.5 liters of water and extracted successively with 1000, 200, and 200 milliliters of diethyl ether. The ether layers are combined, dried over anhydrous magnesium sulfate, filtered, and evaporated to a constant weight of 23.92 grams. The yield is 26% as determined by vapor phase chromatography using methyl benzoate as the internal standard. The product is distilled to obtain substantially pure gamma-(5-hexenyl) gamma-butyrolactone (boiling point of 95° C. at 0.47 millimeter of mercury). Carbon and hydrogen analyses for the product are: Calculated: C, 71.39; H, 9.59. Found: C, 70.94; H, 9.59.

The lactone has the following formula

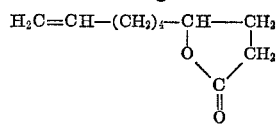

EXAMPLE 2

By substituting 1,5-hexadiene for 1,7-octadiene in Example 1, the following lactone is obtained

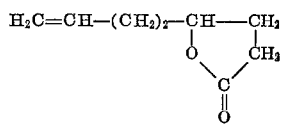

The lactone has a boiling point of 90° C. at 1 millimeter of mercury.

EXAMPLE 3

By substituting 2,5-dimethylhexadiene-1,5 for 1,7-octadiene in Example 1, the following lactone is obtained

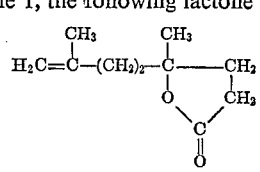

The lactone has a boiling point of 100° C. at 0.5 millimeter of mercury.

EXAMPLE 4

By repeating the procedure of Example 1 but charging the lactone product thereof instead of 1,7-octadiene, the following dilactone is obtained

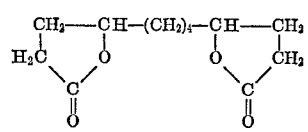

EXAMPLE 5

In this example, 2,5-dimethylhexadiene-1,5 and cyanoacetic acid were employed. To a 1.3 liter Pyrex bomb were added 29.42 grams (0.1 mole) of manganic acetate dihydrate and 950 milliliters of a 10% solution of potassium acetate in acetic acid. The mixture was degassed by bubbling nitrogen through it for a period of 20 minutes. The manganic acetate dihydrate dissolved upon warming the mixture to 50° C. Then, in rapid succession, 34.03 grams (0.4 mole) of the cyanoacetic acid and 22.4 grams (0.2 mole) of the 2,5-dimethylhexadiene-1,5 were added. These were rinsed into the bomb with 50 milliliters of acetic acid. After one hour at 50° C., the acetic acid was distilled from the mixture. The residue was taken up in 1500 milliliters of water and extracted with 400, 300, and 200 milliliter portions of diethyl ether. The combined ether layers were then extracted with sufficient cold 10% aqueous solution of sodium carbonate to form a slightly basic aqueous layer. The basic layer was then extracted once with diethyl ether. The combined ether layers were dried over anhydrous magnesium sulfate, filtered, and evaporated to a constant weight. The following substituted butyrolactone was obtain in a 20% yield on the basis of the manganic ion consumed:

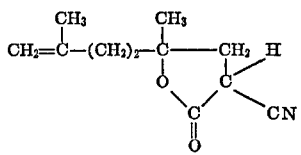

We claim:
1. The lactone which has the formula

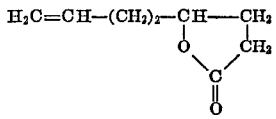

2. The lactone which has the formula

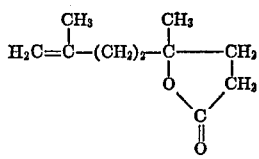

3. The lactone which has the formula

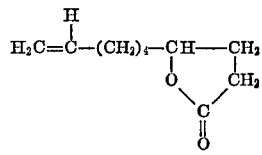

4. The lactone which has the formula

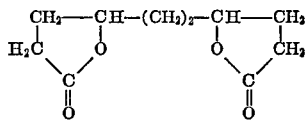

5. The lactone which has the formula

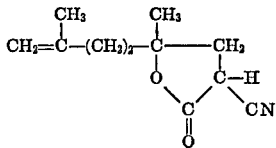

References Cited
UNITED STATES PATENTS
3,332,963   7/1967   Cramer et al. _____ 260—343.6

ALEX MAZEL, Primary Examiner
A. M. T. TIGHE, Assistant Examiner

U.S. Cl. X.R.
252—32.5; 260—76, 429 R, 526 N, 999

UNITED STATES PATENT OFFICE
CERTIFICATE OF CORRECTION

Patent No. 3,758,514              Dated September 11, 1973

Inventor(s)  El Ahmadi I. Heiba and Ralph M. Dessau

It is certified that error appears in the above-identified patent and that said Letters Patent are hereby corrected as shown below:

Column 1, line 30, "managanic" should read --manganic--.

Column 3, Equation (4), that portion referring to product (A) should read:

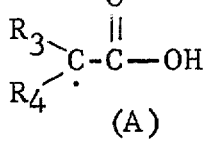

(A)

Column 3, Equation (5), the first portion thereof should read:

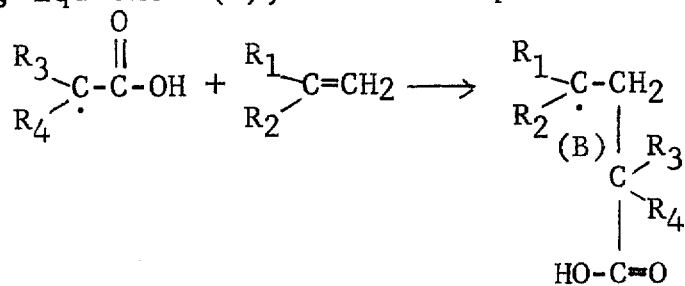

Column 5, line 31, after "group" the period (.) should be a comma (,).

Signed and sealed this 18th day of December 1973.

(SEAL)
Attest:

EDWARD M. FLETCHER, JR.　　　　　RENE D. TEGTMEYER
Attesting Officer　　　　　　　　Acting Commissioner of Patents